(12) United States Patent
Ray et al.

(10) Patent No.: US 11,212,272 B2
(45) Date of Patent: Dec. 28, 2021

(54) SECURE PASSWORD-BASED SINGLE SIGN-ON

(71) Applicant: MICROSOFT TECHNOLOGY LICENSING, LLC., Redmond, WA (US)

(72) Inventors: Mayukh Ray, Sammamish, WA (US); Jasmine Rae Perez, Sammamish, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 476 days.

(21) Appl. No.: 16/118,368

(22) Filed: Aug. 30, 2018

(65) Prior Publication Data

US 2020/0076792 A1 Mar. 5, 2020

(51) Int. Cl.
*H04L 29/06* (2006.01)
*G06F 21/45* (2013.01)
*H04L 29/08* (2006.01)

(52) U.S. Cl.
CPC ........ *H04L 63/0815* (2013.01); *H04L 63/083* (2013.01); *H04L 63/102* (2013.01); *G06F 21/45* (2013.01); *H04L 67/02* (2013.01)

(58) Field of Classification Search
CPC . H04L 63/0815; H04L 63/083; H04L 63/102; H04L 67/02; G06F 21/45
See application file for complete search history.

(56) References Cited

U.S. PATENT DOCUMENTS

| | | |
|---|---|---|
| 2009/0013394 A1 | 1/2009 | Marcus et al. |
| 2009/0217301 A1* | 8/2009 | Grant ............... H04L 67/02 719/320 |
| 2011/0265168 A1* | 10/2011 | Lucovsky ......... H04L 63/083 726/7 |
| 2012/0011578 A1 | 1/2012 | Hinton et al. |
| 2013/0086669 A1 | 4/2013 | Sondhi et al. |
| 2015/0134956 A1* | 5/2015 | Stachura .......... H04L 63/0807 713/168 |
| 2016/0021097 A1* | 1/2016 | Shrotri ............. H04L 63/0815 726/8 |
| 2017/0013070 A1* | 1/2017 | Comstock ......... H04L 67/146 |
| 2017/0142094 A1* | 5/2017 | Doitch ............. H04L 63/102 |
| 2018/0026964 A1* | 1/2018 | Child .............. H04L 63/062 726/8 |

(Continued)

OTHER PUBLICATIONS

"International Search Report and Written Opinion Issued in PCT Application No. PCT/US2019/039674", dated Oct. 1, 2019, 12 Pages.

(Continued)

*Primary Examiner* — Kristine L Kincaid
*Assistant Examiner* — Alexander R Lapian

(57) ABSTRACT

A secure password-based single sign-on process enables a user to access a web application without the authorization credentials transmitted over a distributed computing network. A network directory service system utilizes an identity management system, outside of the client device, to execute a sign-on to a web-based resource in a Hyper-V container. The browser cookie from the sign-on process is returned to the client device in a sign-on script that the client-side browser uses to transition to the web portal or home page of the target web-based resource.

20 Claims, 4 Drawing Sheets

(56) References Cited

U.S. PATENT DOCUMENTS

2019/0334913 A1* 10/2019 Cicchitto ............ H04L 67/1002

OTHER PUBLICATIONS

"Single Sign-on to Applications in Azure Active Directory", Retrieved from: https://docs.microsoft.com/en-us/azure/active-directory/manage-apps/what-is-single-sign-on, Jul. 17, 2019, 11 Pages.

* cited by examiner

SECURE PASSWORD-BASED SINGLE SIGN-ON

BACKGROUND

A network directory service controls access to network resources by authenticating the identity of the end users requesting access to the devices, applications, and/or services (i.e., resources) controlled by the network directory service. The network directory service may utilize an identity management system that authenticates each end user that initiates a sign-on or log-in to access a resource controlled by the network directory service. The sign-on process may be initiated by a browser that signs-on or logs-in to a web-based resource using a set of credentials (e.g., user name, password, fingerprint scan, retina scan, voice print, etc.). Upon authentication of the user's credentials, a user session is initiated. In the case where an end user accesses multiple resources within a single domain, a single sign-on process may be used to enable the end user, within the same user session, to access multiple web-based resources using a single set of credentials. The single sign-on process authenticates the identity of an end user for all resources that the end user is authorized to access.

Password-based single sign-on is a password management scheme whereby the credentials to multiple web-based resources are stored in a central directory and managed by an identify management system. The identity management system retrieves the credentials from the central directory and transmits the credentials back to a browser which types the credentials into a HTML-based sign-in page of the resource on behalf of the user. In this manner, the end user does not have to know the credentials needed to access the resource and the end user automatically obtains access without performing another sign-on process. The credentials are obfuscated at the end of the sign-on process. However, the credentials are often transmitted to the browser over a network, such as the Internet, where the credentials can be detected by a malicious user using network debugging tools thereby presenting a potential security breach.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A secure password-based single sign-on process is utilized by a directory service to automatically sign-in an end user to one or more web-based resources (e.g., web application, service, device) whose authorization is controlled by the directory service. The directory service executes a sign-on process to a web-based resource on behalf of the end user in an isolation execution environment that is outside of the end user's device. A browser cookie returned from execution of the sign-on process in the isolation execution environment is transmitted back to the end user's device.

The directory service utilizes a browser extension to the end user's browser to interact with the directory service to perform the single sign-on to a target web-based resource. The browser extension or directory sign-on component receives the browser cookie from the directory service's execution of the sign-on process which is used in subsequent requests to the web-based resource.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 1 illustrates an exemplary system of a secure password-based single sign-on.

FIGS. 2A-2B are flow diagrams illustrating an exemplary method used to perform a secure password-based single sign-on.

DETAILED DESCRIPTION

Overview

The subject matter disclosed pertains to a mechanism for a secure password-based single sign-on. In one aspect of the present disclosure, the mechanism avoids disclosing the password or credential used to access a web-based resource to an end user's device by avoiding transmission of the password or credential in a network communication to the end user's device. Instead, a single sign-on process is performed in a secure environment within a directory service and the end user's device is provided with a browser cookie. The browser cookie enables the end user's browser to sign-on to the web-based resource automatically without any intervention on the part of the end user.

Password-based single sign-on is often used to allow multiple end users of an organization access to web applications without exposing the sign-on credentials to the end users. In some implementations of a password-based single sign-on, a sign-on script is provided to the end user's browser so that the browser executes the sign-on script thereby performing the sign-on automatically without any intervention by the end user and without the end user knowing the credentials.

In order to avoid embedding the credentials in such a sign-on script that is transmitted over a network to the end user's browser, the sign-on script is executed outside of the end user's browser and in a secure execution environment in a directory service. The directory service controls access to network resources by authenticating the identity of the end user requesting access to the devices, applications, and/or services (i.e., resources). The directory service utilizes an identity management system that authenticates each end user that initiates a sign-on or log-in to access a resource controlled by the directory service.

A browser extension (i.e., browser add-on, plug-in, etc.) to the end user's browser is provided to facilitate communications between the end user's browser and the directory service. The browser extension initiates a single sign-on request and receives a browser cookie upon completion of the sign-on process from the directory service. The browser cookie is then set in the end user's browser and used in subsequent requests to the signed-in web-based resource.

Attention now turns to a more detailed description of a system for secure password-based sign-on.

Secure Password-Based Single Sign-on System

Figure 1:
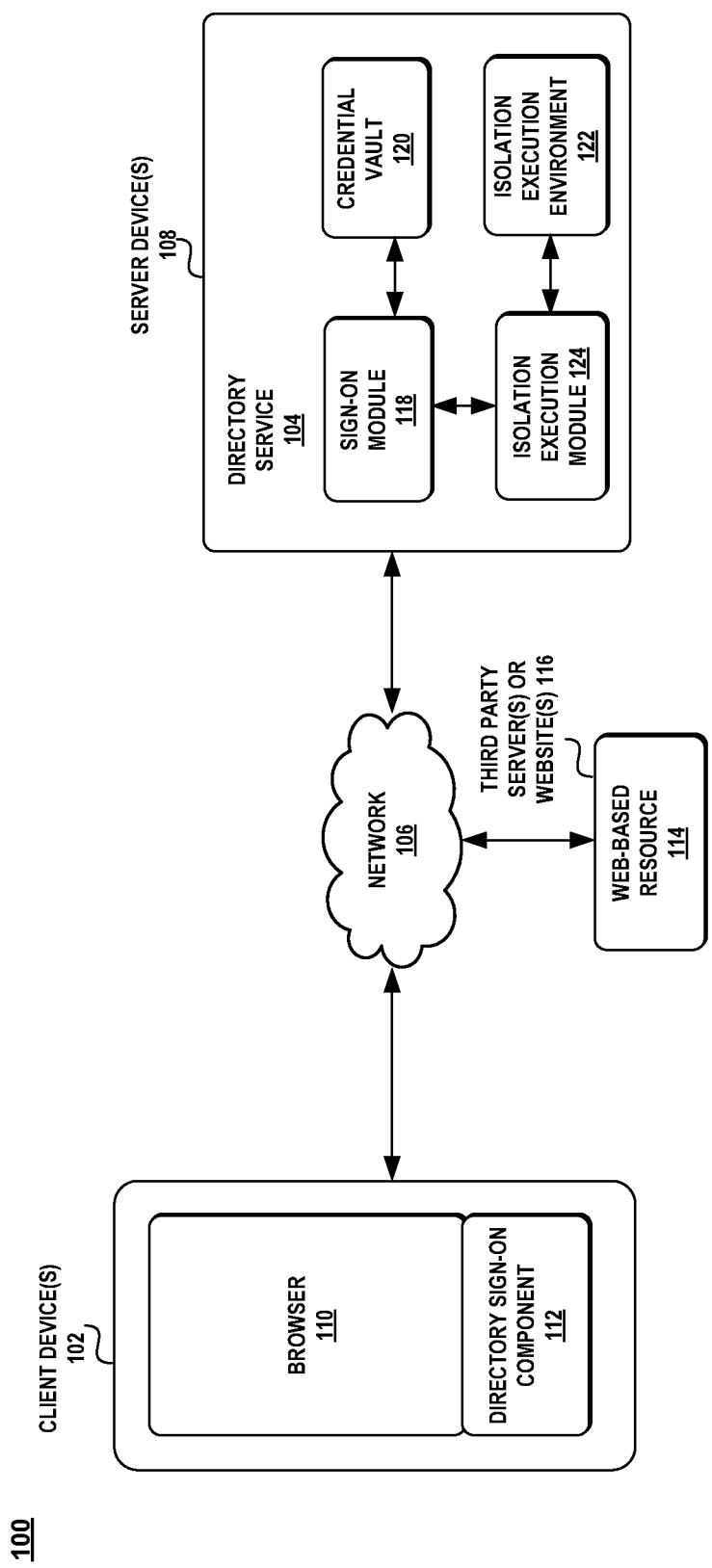

Turning to FIG. 1, there is shown an exemplary system embodying a secure password-based single sign-on. The system 100 includes one or more client devices 102 communicatively coupled to a directory service 104 through a network 106. In one aspect, the directory service 104 is a cloud service that provides access control and identity management for the applications and resources associated with an organization and/or end user. The directory service 104 offers identity management and single sign-on to multiple cloud-based Software as a Service (SaaS) applications and/or on-premise applications. The directory service 104 may be composed of one or more server devices 108. Examples of a directory service 104 include, without limitation, Azure Active Directory, Amazon Web Services, Google Cloud Platform, and the like.

An end user (i.e., customer, client, user, developer, etc.) communicates with the directory service for access to one or more web applications through a distributed network 106, such as the Internet, using the HyperText Transfer Protocol (HTTP). In one aspect of the disclosure, a remote or web-based authentication endpoint is registered with the end user's device, application, browser, service or with a local directory service system. The web-based authentication endpoint is a port that connects the client device 102 with the directory service 104. The endpoint is the uniform resource locator (URL) that the end user's device, browser, or browser's extension uses to access the directory service 104.

The browser 110 has a directory sign-on component 112 that facilitates communications with the directory service 104. The directory sign-on component 112 may be a browser extension, add-on module, plug-in module, or the like that extends the functionality of the browser to interact with the directory service 104. The directory sign-on component 112 also enables the browser 110 to interact with one or more web-based resources 114 (i.e., web applications, services, devices, etc.) hosted on third party servers or websites 116.

The directory service 104 may include a sign-on module 118, a credential vault 120, an isolation execution environment 122, and an isolation execution module 124. The sign-on module 118 provides single sign-on to one or more web-based resources that the end user is authorized to access. The credential vault 120 securely stores the credentials of an organization and/or end user to each of the resources controlled by the directory service 104.

The credential vault 120 stores the encrypted credentials. In one aspect of the disclosure, the credential vault 120 and the sign-on module 118 authenticate each other by verifying a provided public key certificate or digital certificate (e.g., X.509 Public Key Infrastructure (PM) certificate) so that both parties are assured of the others' identity. The digital certificate is issued by a trusted certificate authority. The digital certificate enables a secure encrypted channel for communications between the sign-on module 118 and the credential vault 120 and provides a private/public key pair for each party to use.

The sign-on module 118 requests the credentials of an end user associated with a particular directory userid and for a web-based resource associated with a particular URL. The credential vault 120 upon verification of the directory userid and URL, retrieves the encrypted credentials which is sent back to the sign-on module 118. The sign-on module 118 decrypts the encrypted credentials with its own private key.

The sign-on module 118 receives requests from the directory sign-on component 112 for access to a web-based resource and generates a sign-on script for the end user's browser to use to sign-on to an intended web application or resource. The sign-on script may be written in a scripting language (e.g., JavaScript, HTML, ECMAScript, JSON, etc.), programming language or combination thereof. The sign-on script is used by the directory sign-on component 112 to invoke the server of the intended resource, facilitate a user session with the server of the intended resource, fill in the data needed in the sign-on process with the intended resource, respond to requests from the server of the intended resource, handle error conditions, and facilitate successful operation of the sign-on process.

The isolation execution module 124 creates an isolation execution environment 122 within which the sign-on script executes with the credentials securely in the directory service 104. The isolation execution module 124 interacts with the sign-on module 118 using a mutual authentication process by verifying a provided public key certificate or digital certificate (e.g., X.509 Public Key Infrastructure (PM) certificate) so that both parties are assured of the others' identity. The digital certificate enables a secure encrypted channel for communications between the sign-on module 118 and the isolation execution module 124.

Although FIG. 1 depicts the system and process in a particular configuration, it should be noted that the subject matter disclosed herein is not constrained to the configuration shown in FIG. 1. For example, the client device 102 may utilize a rich client application rather than a browser to interact with the directory service. A rich client application is an application on a computing device that retrieves data from the Internet without the use of a browser.

Methods

Attention now turns to description of the various exemplary methods that utilize the system and device disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 2A:
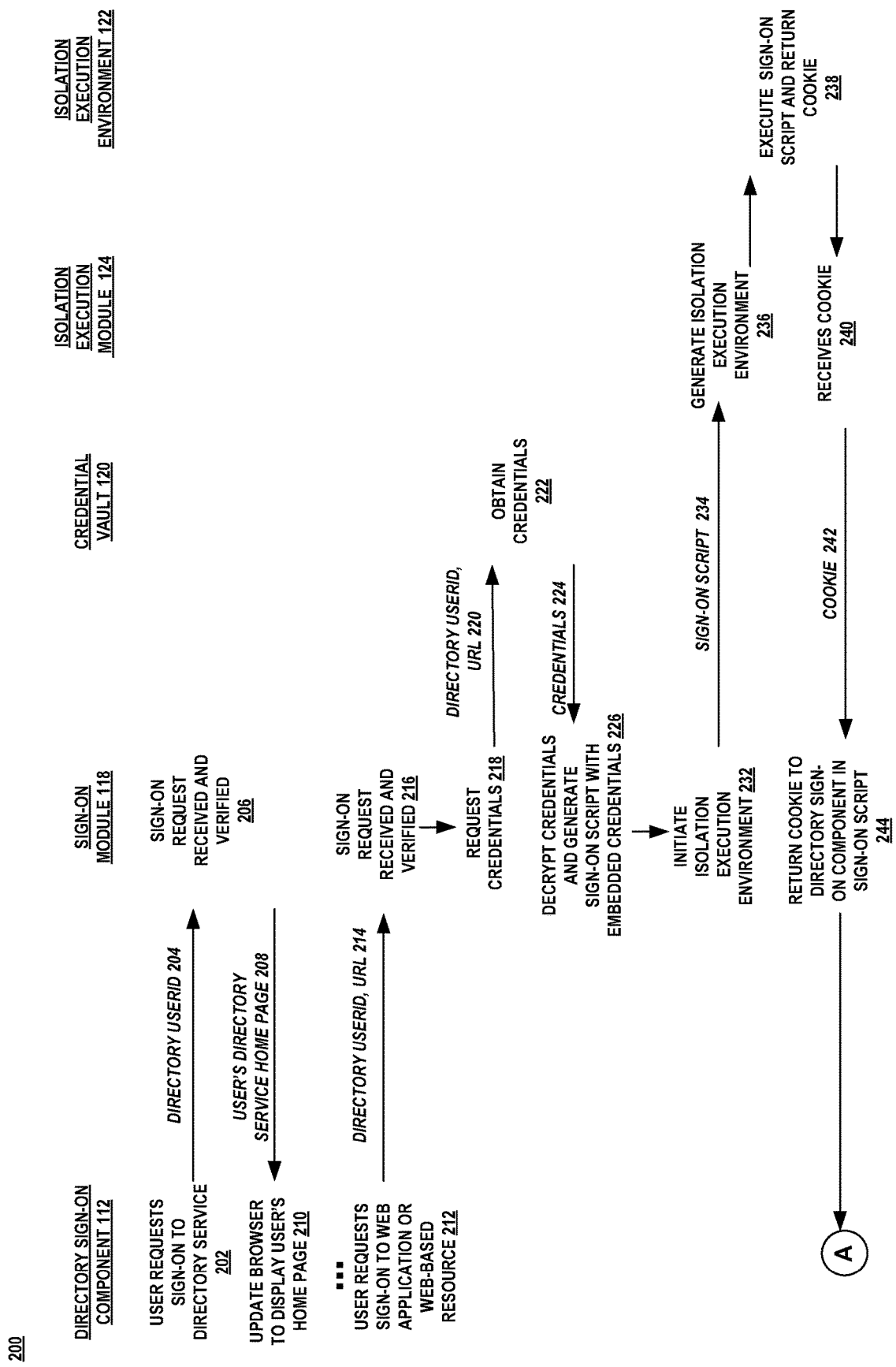

Turning to FIG. 2A, there is shown an exemplary method 200 of the secure password-based single sign-on. An end user initially signs-on to the directory service 104 through the directory sign-on component 112 using a directory userid and/or password 204 (block 202). The end user may be part of an organization or enterprise having an account with the directory service 104 where the account maybe shared with other end users in the same organization. Alternatively, the end user may have a dedicated account. In any configuration, once the end user signs on to the directory service 104, all subsequent accesses to the resources controlled by the directory service 104 are seamless to the end user and do not require the end user to perform a further sign-on process.

The sign-on module 118 receives the sign-on request and verifies it (block 206) and provides the user's directory service home web page 208 to the end user's browser 110 which is displayed to the end user (block 210). In one aspect, the directory service 104 may provide a common web portal that enables an end user to access all their web-based resources. The end user may initiate access to a particular web-based resource from the end user's browser. The directory sign-on component 112 is registered with the endpoint of the directory service 104 thereby enabling the browser 110 and directory service 104 to communicate.

Thereafter, the end user may request access to a web-based resource, such as a web application, thereby prompting a sign-on to the web application (block 212). The end users' directory service userid and the URL of the web application 214 is submitted to the sign-on module 118 (block 212). The sign-on request is received and verified by the sign-on module 118 (block 216). Once verified, the sign-on module 118 requests the credentials of the end user for the web application (block 218). The request may include the end user's directory userid and the URL of the web application 220.

The credentials 224 are obtained from the credential vault 120 (block 222) which are then decrypted by the sign-on module 118 using the sign-on module's private key (block 226). The sign-on module 118 generates a sign-on script that when executed signs in the end user to the web application (block 226). The sign-on script includes the credentials. In one aspect, the sign-on script may be implemented in a scripting programming language, such as without limitation, JavaScript, Hypertext Markup Language (HTML), etc. However, the sign-on script is not limited to any particular type of programming language or particular programming language.

Next, the sign-on module 118 communicates with the isolation execution module 124 to initiate an isolated execution environment 122 in which the sign-on script 234 is executed (block 232). There are various types of isolated execution environments. A container is one such isolation execution environment 122 that provides an isolated, resource controlled, portable runtime environment which runs on a host machine or virtual machine. A container holds all the components needed to execute a software application, such as files, libraries, dependencies, environment variables, etc. A container executes images which are a complete, static, and executable version of a software application. A host operating system (OS) restricts a container's access to physical resources, such as CPU, storage and memory. A container shares the OS kernel where one instance of an OS can run in many isolated containers. The OS supporting a container may be smaller with fewer features than an OS running a virtual machine (VM) or physical application.

There are different types of containers where each container type has different isolation requirements. A Windows Server container provides isolation through namespace and process isolation. Namespaces contain all the resources that an application can interact with, such as files, network ports, and the list of running processes. Namespace isolation allows the host to give each container a virtualized namespace that includes only the resources that it needs. With this restricted view, a container can't access files not included in its virtualized namespace regardless of their permissions since it cannot see them. An application cannot interface with applications that it is not aware of.

A Hyper-V container is an optimized VM which has a dedicated OS kernel. The Hyper-V container differs from the Windows Server container since the Hyper-V container does not share an OS kernel with other containers on the host or the host OS. The Hyper-V container differs from a VM since it only has a dedicated OS kernel and not an entire operating system.

A virtual machine differs from a container since a VM runs an OS in an independent environment. A VM requires a substantial overhead since a VM has its own copy of the OS files, libraries, application code, along with full in-memory instance of an OS. Initiating a new VM requires booting another instance of the OS, even if the host or existing VMs already have running instances of the same version, and loading the application libraries into memory. Each application that runs in the VM pays the cost of the OS boost and the in-memory footprint for its own private copies which limits the number of VMs that can run on the host.

In one aspect of the disclosure, the isolation execution module 124 generates a Hyper-V container as the isolation execution environment 122 (block 236). The Hyper-V container contains the sign-on script and a headless browser which is used to execute the sign-on script. A headless browser is a web browser that does not contain a user interface and provides automated control of a web page through network node application programming interfaces (APIs) or a command line interface. Examples of a headless browser include Google Chrome Puppeteer, Firefox browser in headless mode, PhantomJS, and the like.

The isolation execution environment 122 executes the sign-on script in the Hyper-V container with the credentials and receives a browser cookie upon successful completion (block 238). A browser cookie (i.e., web cookie, HTTP cookie, Internet cookie, cookie, authentication cookie) is data that is sent by a website and which retains stateful information for the website. The stateful information may indicate that the browser has been authenticated with the website previously and does not require further authentication. In one aspect of the present disclosure, the browser cookie represents an authentication state (e.g., authenticated, not authenticated) of the end user's browser with the target website. HTTP is a stateless communication protocol and the browser cookie is used during the end user's session with the website in order to avoid further sign-on authorizations. The browser cookie is used to tell if multiple requests came from the same browser thereby keeping the end user signed into the website.

Upon completion of the sign-on process, the isolation execution module 124 obtains the browser cookie (block 240). The browser cookie 242 is then embedded into the sign-on script and returned to the browser through the directory sign-on component 112 (block 244). In one aspect, the browser cookie is marked with flags to ensure its security during the transmission to the client device. The browser cookie may contain a "safe" flag indicating that the transmission is over Hypertext Transfer Protocol Secure (HTTPS) or with the "HTTPOnly" flag that indicates that the cookie should only be accessed by the website. However, it should be noted that the disclosure is not limited to these techniques and that other techniques may be employed.

Figure 2B:
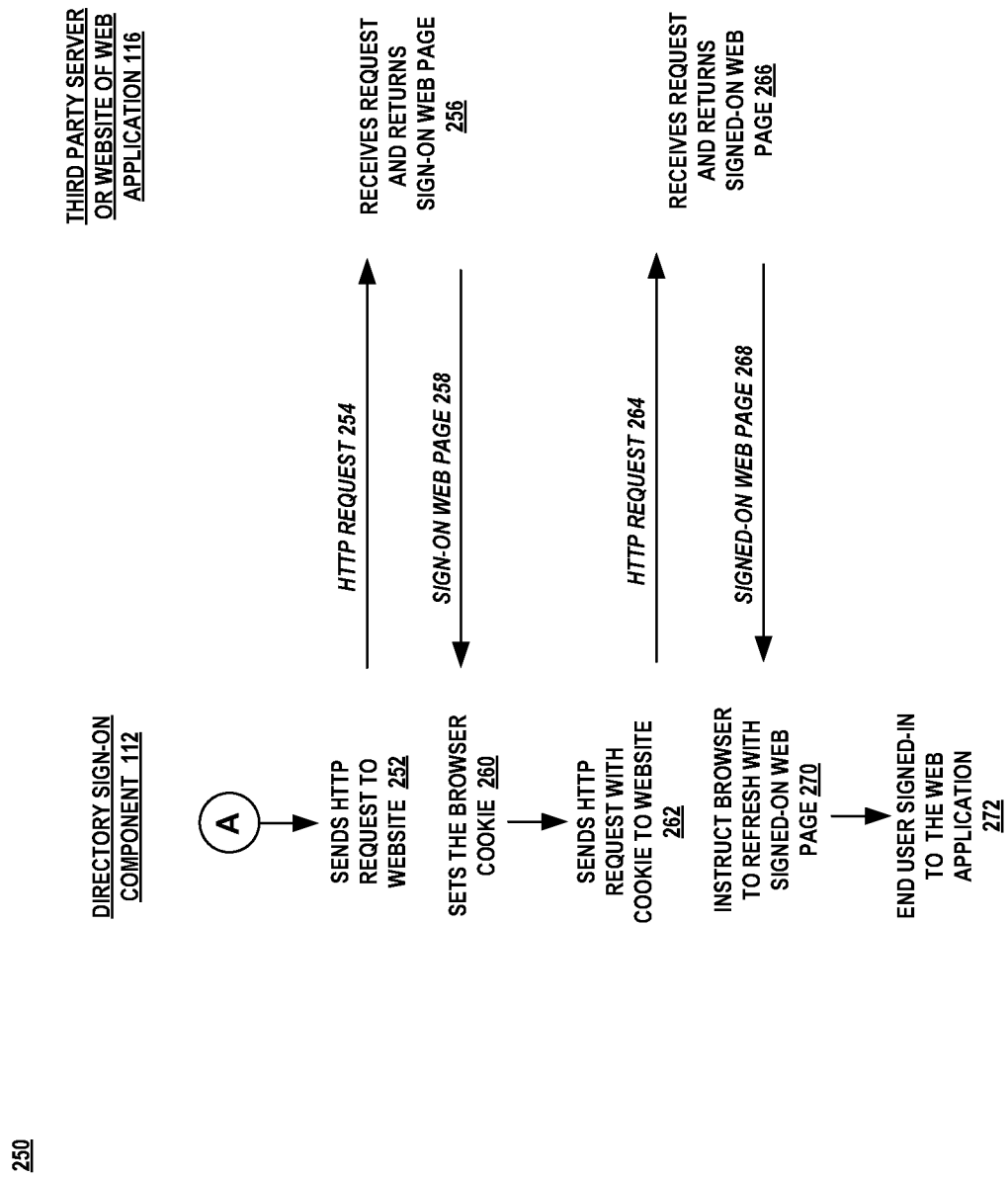

Turning to FIG. 2B, the directory sign-on component 112 sends an HTTP request 254 to the website of the web application (block 252) which is received by the website which returns a sign-on web page 258 to the directory sign-on component 112 (block 256). The directory sign-on component 112 sets the browser cookie in the end user's browser (block 260). The directory sign-on component 112 sends a HTTP request 264 with the cookie to the website (block 262) which is received by the website 116. In response to the HTTP request 264, the website 116 returns a signed-on web page 268 to the directory sign-on component 112 (block 266). The directory sign-on component 112 then instructs the browser 110 to refresh its display with the signed-on web page (block 270) and the end user is signed into the web application (block 272).

Exemplary Operating Environment

Figure 3:
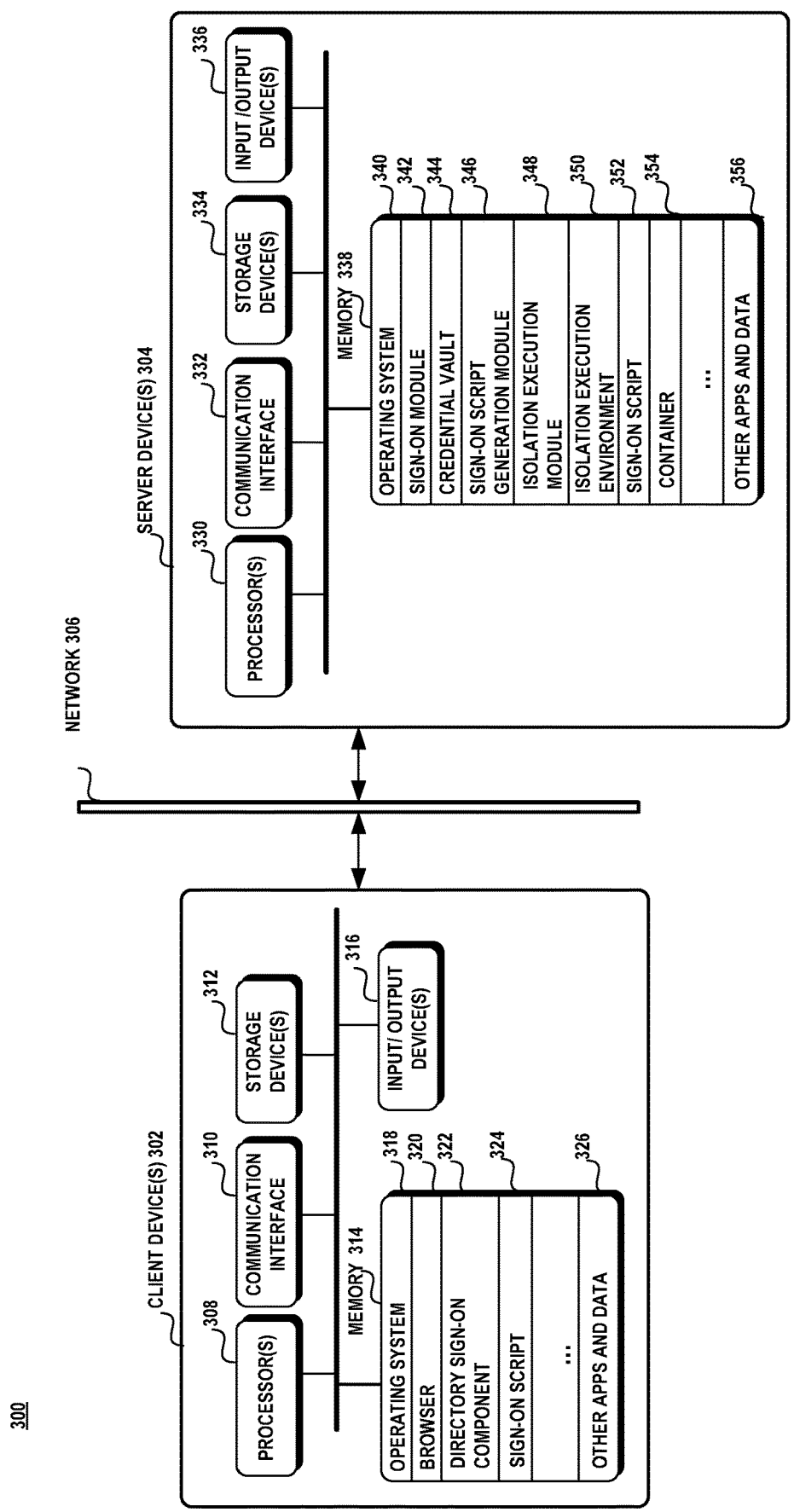
FIG. 3 is a block diagram illustrating an exemplary operating environment.

Attention now turns to FIG. 3 and a discussion of an exemplary operating environment 300. It should be noted that the operating environment 300 is exemplary and is not intended to suggest any limitation as to the functionality of the embodiments. The embodiments may be applied to an operating environment 300 having one or more client devices 302 coupled to one or more server devices 304 through network 306. The server devices 304 form a cloud service that is available on demand through the Internet.

The client devices 302 and the server devices 304 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 300 may be configured in a network environment, a distributed environment, a multi-processor environment, or a stand-alone computing device having access to remote or local storage devices.

A client device 302 may include one or more processors 308, a communication interface 310, one or more storage devices 312, a memory 314, and one or more input/output (I/O) devices 316. A processor 308 may be any commercially available processor and may include dual microprocessors and multi-processor architectures. The communication interface 310 facilitates wired or wireless communications between the client device 302 and other devices. The storage devices 312 may be computer-readable medium that do not contain propagating signals, such as modulated data signals transmitted through a carrier wave. Examples of the storage devices 312 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. The input/output (I/O) devices 316 may include a keyboard, mouse, pen, voice input device, touch input device, a display, speakers, printers, etc., and any combination thereof.

The memory 314 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 314 may also include one or more external storage devices or remotely located storage devices that do not pertain to propagated signals, such as modulated data signals transmitted through a carrier wave.

The memory 314 may contain instructions, components, modules, and data. A component is a software program that performs a specific function and is otherwise known as a module, application, and the like. The memory 314 may include an operating system 318, a browser 320, a directory sign-on component 322, a sign-on script 324 and various other applications, components, and data 326.

The server devices 304 also include one or more processors 330, a communication interface 332, one or more storage devices 334, I/O devices 336, and a memory 338 as described above. The memory 338 may include an operating system 340, a sign-on module 342, a credential vault 344, a sign-on script generation module 346, an isolation execution module 348, an isolation execution environment 350, a sign-on script 352, a container 354, and other applications and data 356.

The network 306 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of performing a secure password-based sign-on to a web-based resource controlled by a directory service without passing the credentials to a client device. The technical features associated with addressing this problem involves executing a sign-on script with a headless browser on a server, separate from the client device, in a secure container, such as an isolation execution environment. The sign-on script includes the credentials needed to sign-on to the web-based resource. The secure container ensures that the credentials are not visible to the client device and are not part of any network transmission to the client device. A browser cookie returned from execution of the sign-on script is returned to the client device. The end user browser executes the sign-on script with the browser cookie to obtain access to the web-based resource. In this manner, a technical effect is achieved providing a secure single sign-on process that cannot be hampered with by the client device or through network communications with the client device. In addition, a technical effect is achieved by the directory service in providing a more secure single sign-on thereby preventing malicious users from accessing unauthorized web-based resources under its control.

CONCLUSION

A system is disclosed that includes at least one processor and a memory coupled to the at least one processor. The at least one processor is configured to generate a first sign-on script, at a directory service, to provide an end user authenticated access to a remote web-based resource, the first sign-on script includes a password associated with the remote web-based resource and the end user, the directory service controls authentication of the end user to the remote web-based resource, execute, in the directory service, the first sign-on script in an isolation execution environment that is separate from an end user device, obtain an authentication state from the execution of the first sign-on script, and return the authentication state to the end user device.

The system is further configured to embed the authentication state in a second sign-on script that is transmitted to the end user device as well as obtain the password of the end user for the remote web-based resource from a credential vault of the directory service. The isolation execution environment includes a container having a dedicated OS kernel. The first sign-on script performs a single sign-in to the remote web-based resource. The password is not included in the second sign-on script. The first sign-on script is executed in the isolation execution environment with a headless browser. The authentication state is a browser cookie.

A device is disclosed has at least one processor coupled to a memory, a browser and a browser extension. The browser includes instructions for displaying one or more web pages. The browser extension includes instructions that when executed on the at least one processor perform actions that: submit at least one HTTP request to a directory service for single sign-on authentication to a web-based resource, wherein the directory service authenticates access to the web-based resource using a user credential; receive a browser cookie from the directory service, the browser cookie representing an authentication state obtained from the web-based resource; set the browser cookie in the browser; and transmit the browser cookie in one or more HTTP requests to obtain access to the web-based resource, wherein the one or more HTTP requests are without the user credential and without user intervention.

The browser cookie is obtained in a sign-on script from the directory service. The browser extension includes instructions that when executed by the at least one processor includes actions that generate an HTTP request to sign-on to the web-based resource using the browser cookie without a user credential, use a sign-on script without the user credential to sign-on to the web-based resource, and instruct the browser to refresh a current display with a signed-on web page from the web-based resource. The user credential includes a password.

A method performed on the system and device comprises hosting a directory service to perform single sign-on to one or more web-based resources, wherein the directory service controls authentication to the one or more web-based resources, storing one or more credentials associated with access to the one or more web-based resources, executing in the directory service a sign-on to a first web-based resource in an isolation execution environment on behalf of a first end user, the sign-on including a credential associated with the first end user, obtaining a browser cookie from execution of the sign-on, and enabling the first end user to sign-on to the first web-based resource through access to the browser cookie.

The method further comprises configuring the isolation execution environment in the directory service with a Hyper-V container in addition to generating a first sign-on script including a credential associated with the first web-based resource and the first end user, and executing the first sign-on script in the isolation execution environment. The method also comprises receiving the browser cookie from the execution of the first sign-on script, generating a second sign-on script including the browser cookie to enable the first end user access to the first web-based resource, the second sign-on script void of the credential, transmitting the second sign-on script to the end user device for use by a browser of the end user device to obtain a signed-on web page of the first web-based resource.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
   at least one processor and a memory coupled to the at least one processor;
   wherein the at least one processor is configured to perform acts that:
   receive, at a directory service, a first request to sign into a user account of a user at the directory service, wherein the first request includes a first credential of the user account;
   upon successful authentication of the first request, return a directory service home web page of the user;
   receive a second request, at the directory service, for access to a web application of the user account;
   obtain, from the directory service a second credential of the user for the web application, wherein the first credential and the second credential differ;
   generate a first sign-on script, at the directory service, the first sign-on script includes the second credential;
   execute the first sign-on script in an isolation execution environment in the directory service;
   obtain an authentication state from the execution of the first sign-on script; and
   return a second sign-on script, the second sign-on script including the authentication state.

2. The system of claim 1, wherein the at least one processor is configured to perform acts that provide access to the web application upon execution of the second sign-on script.

3. The system of claim 1, wherein the isolation execution environment includes a container having a dedicated Operating System (OS) kernel.

4. The system of claim 1, wherein the second sign-on script performs a single sign-in to the web application.

5. The system of claim 1, wherein the at least one processor is further configured to perform acts that obtain the second credential of the user for the web application from a credential vault of the directory service.

6. The system of claim 5, wherein the second credential is not included in the second sign-on script.

7. The system of claim 1, wherein the first sign-on script is executed in the isolation execution environment with a headless browser.

8. The system of claim 1, wherein the authentication state is a browser cookie.

9. A method performed on a computing device having at least one processor and a memory, the method comprising:
   hosting a directory service to perform single sign-on into a first web application associated with a user account of a user of the directory service;
   storing, in the directory service, a second credential for access to the first web application;
   receiving, at the directory service, a first request to sign-on to the user account, the first request including a first credential associated with the user account;
   receiving, at the directory service, a second request to sign-on to the first web application;
   executing, in the directory service, the sign-on to the first web application in an isolation execution environment on behalf of the user, the sign-on including the second credential obtained from the directory service, wherein the first credential differs from the second credential;
   obtaining a browser cookie from execution of the sign-on to the first web application;

creating a second sign-on script for subsequent accesses to web applications associated with the user account, the second sign-on script including the browser cookie; and returning the second sign-on script to the user.

10. The method of claim 9, further comprising:
configuring the isolation execution environment in the directory service with a Hyper-V container.

11. The method of claim 9, further comprising:
generating, in the directory service, a first sign-on script including the second credential associated with the first web application; and executing the first sign-on script in the isolation execution environment.

12. The method of claim 11, further comprising:
receiving the browser cookie from the execution of the first sign-on script.

13. The method of claim 9, wherein the isolation execution environment includes a container having a dedicated Operating System (OS) kernel.

14. The method of claim 9, further comprising:
receiving a third request for access to a second web application, the third request including the browser cookie; and
performing a sign-on to the second web application using the browser cookie.

15. A device, comprising:
at least one processor; and
a memory;
wherein the memory includes a browser including instructions for displaying one or more web pages; and a browser extension,
wherein the browser extension includes instructions that when executed by the at least one processor perform actions that:
receives a user directory service home page, of a user, upon successful access to a user account, of the user, at a directory service with a first credential;
upon successful access to the user account, performs a first user request to the directory service to sign-on to a web application of the user account, wherein the directory service authenticates access to the web application in an isolation execution environment in the directory service using a second credential stored in the directory service, wherein the first credential and the second credential differ;
receives a browser cookie from the directory service upon successful verification of the first user request, the browser cookie representing an authentication state from the directory service;
sends a second request to access the web application, the second request including the browser cookie; and
receives a signed-on web page of the web application.

16. The device of claim 15, wherein the browser extension includes further instructions that when executed by the at least one processor perform actions that:
updates the browser to display the signed-on web page of the web application.

17. The device of claim 15, wherein the browser extension includes instructions that when executed by the at least one processor includes actions that:
generates an HTTP request to sign-on to the web application using the browser cookie without a user credential.

18. The device of claim 15, wherein the browser extension includes instructions that when executed by the at least one processor includes actions that:
receives a sign-on script with the browser cookie.

19. The device of claim 18, wherein the browser extension includes instructions that when executed by the at least one processor includes actions that:
uses the sign-on script with the browser cookie to obtain a home page of the web application.

20. The device of claim 15, wherein the browser extension includes instructions that when executed by the at least one processor includes actions that:
updates the browser with the browser cookie.

* * * * *